April 30, 1935. A. E. W. JOHNSON Re. 19,550
IMPLEMENT HITCH
Original Filed Oct. 17, 1931 2 Sheets-Sheet 1
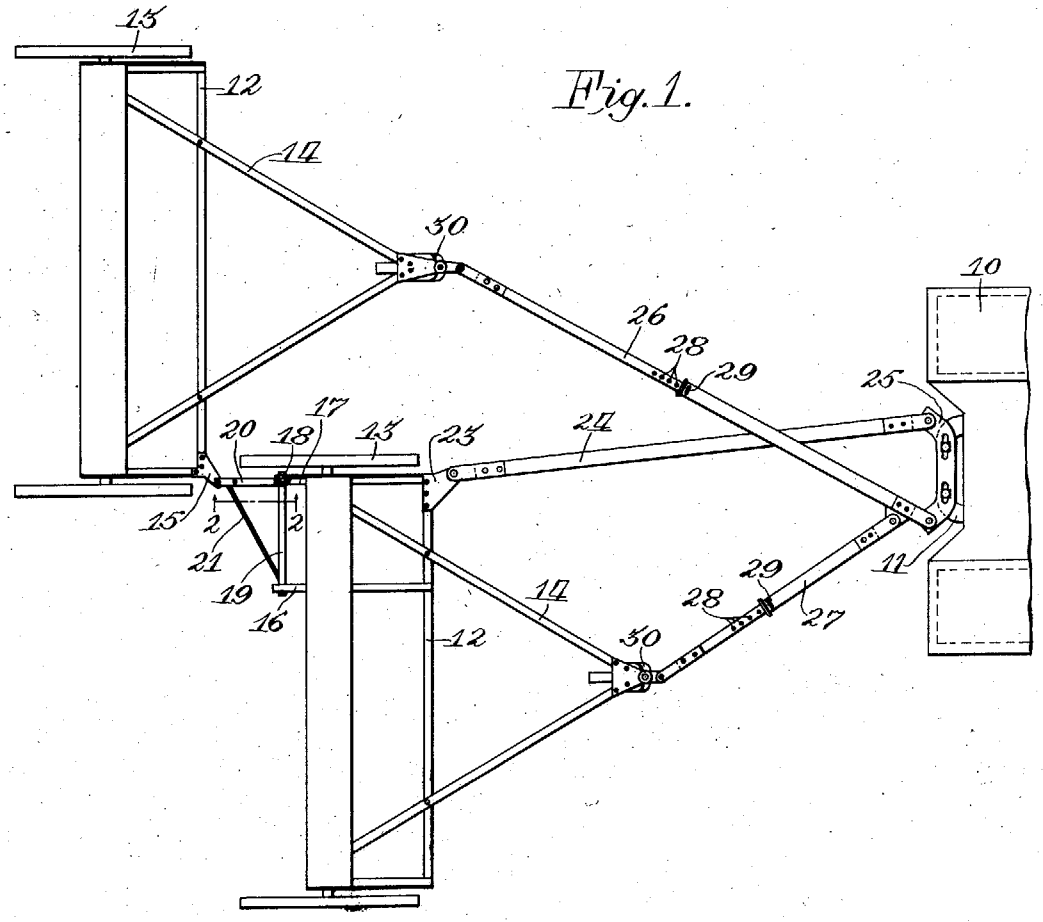
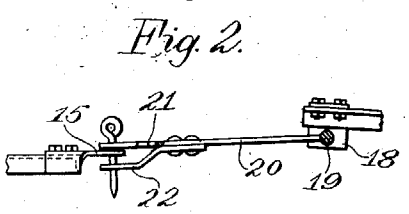
Inventor
Arnold E. W. Johnson
By H. P. Deslinde
Atty.

April 30, 1935. A. E. W. JOHNSON Re. 19,550
IMPLEMENT HITCH
Original Filed Oct. 17, 1931 2 Sheets-Sheet 2
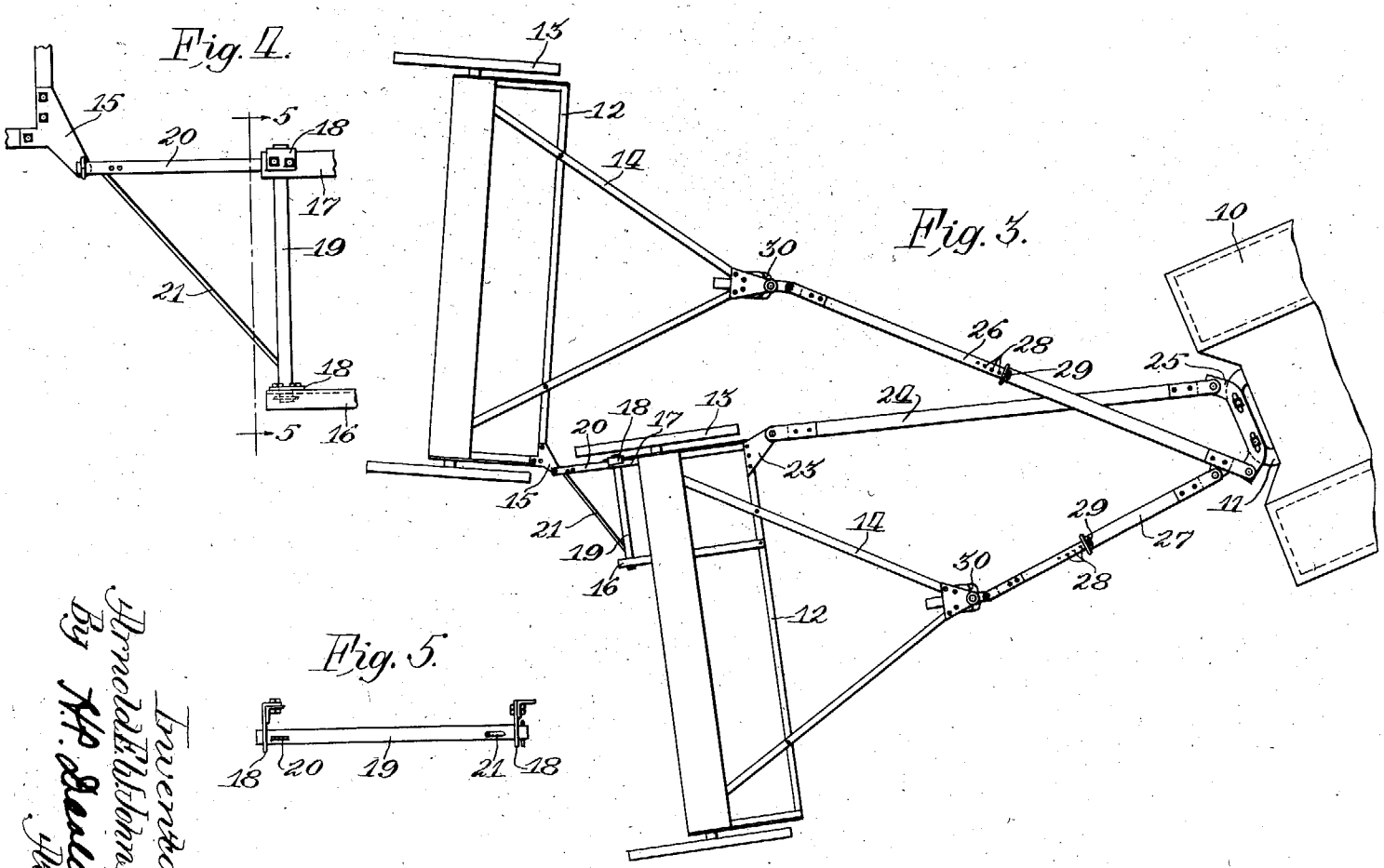
Inventor
Arnold E. W. Johnson
By H. P. Dealich
Atty.

Reissued Apr. 30, 1935

Re. 19,550

UNITED STATES PATENT OFFICE 19,550

IMPLEMENT HITCH

Arnold E. W. Johnson, Chicago, Ill., assignor to International Harvester Company, a corporation of New Jersey Original No. 1,906,753, dated May 2, 1933, Serial No. 569,410, October 17, 1931. Application for reissue September 29, 1934, Serial No. 746,101

12 Claims. (Cl. 280—33.44)

This invention relates to implements adapted for operation with tractors and particularly to a multiple implement assembly and draft means therefor.

The principal object of the invention is to provide an arrangement of implement units with draft means which will permit short turns to be made when the assembly is being operated by a tractor with a minimum of side draft.

Another object is to provide an arrangement of implements, as above set forth, in which the independent implements are angled by the draft of the tractor, whereby the implements and the tractor will angle about substantially the same radii.

Another object is to provide an arrangement of implement units which may be operated over uneven ground and which will travel in paralel adjacent paths when being drawn in a uniform direction.

Other minor objects and advantages will be apparent as the description of the structure comprising the invention proceeds.

Referring to the drawings:

Figure 1 is a plan view showing a duplex grain drill, illustrating one embodiment of the invention;

Figure 2 is an enlarged detailed sectional view taken on the line 2—2 of Figure 1, showing the hitch between the two drills;

Figure 3 is a plan view of the same construction shown in Figure 1, with the tractor in an angle position to illustrate the simultaneous angling of the implement frames;

Figure 4 is an enlarged plan view of the hitch between the two implements; and

Figure 5 is a detailed sectional view, taken on the line 5—5 of Figure 4.

The drawings are somewhat diagrammatic in nature, illustrating only such elements of the tractor and the grain drills as are necessary to show the principle of operation of the improved hitch constituting the invention. The rear portion of a tractor 10 is shown, which is provided with a U-shaped, rearwardly extending drawbar 11. Two grain drills of a conventional construction, such as ordinarily used to be drawn by horses, are shown. Each drill consists of a frame 12, which may be termed as an implement frame, wheels 13, which are rotatably mounted on axles at the ends of the frame 12, and a forwardly extending draft frame 14, rigidly secured to the frame 12. One of the drills is positioned forwardly of the other, in slightly overlapping relation with respect thereto, whereby the two drills will completely cover the ground being traversed without leaving an unseeded gap between the ends of the drills.

The rear drill is provided with a forwardly extending bracket 15 at the inner end. The front drill is provided with rearwardly extending bars 16 and 17, rigidly secured to its frame 12. Downwardly extending bearing brackets 18, secured to said bars, form bearings from a transversely extending shaft 19. A rearwardly extending bar 20 and a brace rod 21 are secured to the shaft 19 to form a connecting frame.

As best shown in Figure 2, said frame is provided with a clevis 22 at the rear end of the bar 20, for pivotally connecting the frame to the bracket 15 on the rear drill. Said pivotal connection is on a vertical axis. However as shown in Figure 2, the clevis is loosely fitted to allow a limited amount of movement about horizontal and longitudinal axes, whereby the drills may be permitted to have relative angular movement with respect to each other about such axes.

A bracket member 23 is secured to the inner end of the forwardly positioned drill at the forward side thereof. A draft element 24 illustrated as a rigid draft member is pivotally connected to said member and to one end of an attaching member 25, rigidly secured to the drawbar. The member 25 extends along the drawbar in each direction, laterally from the center line of the tractor. The draft member 25 is connected to said member at a point spaced laterally from the center line of the tractor, in the direction in which the rearwardly positioned drill extends.

A draft element 26 illustrated as a longitudinally adjustable rigid draft member is pivotally connected to the forward end of the draft frame 14 of the rearwardly positioned drill and to the connecting member on the drawbar at a point spaced laterally from the center line of the tractor in the direction in which the forwardly positioned drill extends.

A draft element 27 illustrated as an adjustable rigid draft member is pivotally connected to the draft frame of the forwardly positioned drill and to the draft member 26 at a point adjacent its connection with the member 25. The various pivotal connections have not been described in detail as they may be of any conventional construction. Those illustrated in the drawings are formed of spaced elements on one member adapted to be connected by a pivot pin to the other member. The adjustment of the members 26 and 27 is illustrated as a telescoping joint formed by making said members in two sections.

The adjustment is provided by a plurality of holes 28 in one section and a pin 29 adapted to be inserted through aligned openings in both sections. The draft frames 14 are provided with caster wheels 30 to maintain the frames in horizontal position.

In the operation of the device as described, the tractor may, for example, be turned to the left, as illustrated in Figure 3. Upon such angling movement of the tractor, the rearwardly positioned drill is angled in the opposite direction. The forwardly positioned drill is angled in the same direction but to a lesser degree than the tractor. An inspection of Figure 3 will show that the two drills and the tractor are turning about substantially the same vertical axis. By turning in this manner there is comparatively little side draft and the implements follow the tractor around without digging into the soil.

As will be understood by inspecting the linkage, when the tractor is turned to the right the forwardly positioned drill will be angled in the same direction as the tractor but to a lesser degree. The rearwardly positioned drill will be angled in the opposite direction, whereby the drills and the tractor will be turned about substantially the same pivot axis.

In implements of this nature, as in other hitches designed to facilitate short turns, there is a difference in the shortness of turn which may be made in different directions. The hitch embodying this invention will permit of sharper turns to the left than to the right.

It is to be understood that applicant has shown and described a preferred embodiment of his improved hitch in connection with duplex grain drills and that he claims as his invention any modification for use of the hitch under any conditions which may be found advantageous falling within the scope of the appended claims.

What is claimed is:

1. A duplex field implement and hitch therefor comprising, in combination with a tractor drawbar, two transversely positioned implements pivotally connected together at their adjacent ends, a draft member pivotally connected to one of the implements and to the drawbar, a second draft member pivotally connected to the other implement and to the first named draft member adjacent the drawbar, and a third draft member pivotally connected at one end to the drawbar at a point spaced from the pivot point of the first named draft member, said third draft member being pivotally connected at its other end to one of the implements near the adjacent ends.

2. A device as set forth in claim 1, in which the implements are provided with forwardly extending draft frames to which the first and second named draft members are connected.

3. A device as set forth in claim 1, in which the first named draft member and the third draft member cross each other between the points of attachment on the implements and the points of attachment on the tractor drawbar.

4. A duplex field implement and hitch therefor comprising, in combination with a tractor drawbar, two wheeled implements transversely positioned behind the drawbar in longitudinally spaced relation with respect to each other, said implements being pivotally connected to each other at their inner ends on transverse and vertical axes, a draft frame rigidly secured to each implement, rigid draft members connecting said frames with the drawbar, and a rigid draft member connected to one implement substantially in longitudinal alignment with their vertical pivot axis and to the drawbar at a point spaced laterally from the connection of the first named draft members.

5. A duplex field implement and hitch therefor comprising, in combination with a tractor drawbar, two wheeled implements transversely positioned behind the drawbar in longitudinally spaced relation with respect to each other, said implements being pivotally connected to each other at their inner ends on transverse and vertical axes, a draft frame extending forwardly from each implement, a draft bar pivotally connected to the draft frame of the rearwardly positioned implement and to the drawbar at a point spaced from the center thereof in the opposite direction from the position of the draft frame, a second draft member pivotally connected to the draft frame of the forwardly positioned implement and to the first named draft member closely adjacent to the drawbar and a third draft member pivotally connected to the drawbar at a point spaced from the center in a direction opposite to the direction of location of the pivot point of the first named draft member, the other end of said member being pivotally connected to the forwardly positioned implement adjacent its inner end.

6. A duplex field implement and hitch therefor comprising in combination with a tractor two transversely positioned implements flexibly connected together at their adjacent ends, a draft element flexibly connected to one of the implements and to the tractor, a second draft element flexibly connected to the other implement and to the tractor at approximately the same point as the first named element, and a third draft element flexibly connected to the tractor at a point spaced transversely from the connection point of the first named draft element, said third draft element being flexibly connected at its other end to one of the implements near the adjacent ends thereof.

7. A duplex field implement and hitch therefor comprising in combination with a tractor two transversely positioned implements flexibly connected together at their adjacent ends, a draft element flexibly connected to one of the implements and to the tractor, a second draft element flexibly connected to the other implement and to the tractor at approximately the same point as the first named element, and a third draft element flexibly connected to the tractor at a point spaced transversely from the connection point of the first named draft element, said third draft element being flexibly connected at its other end to one of the implements near the adjacent ends thereof, at least one of said draft elements being rigid.

8. A duplex field implement and hitch therefor comprising in combination with a tractor, two wheeled implements transversely positioned behind the tractor in longitudinally spaced relation with respect to each other, said implements being pivotally connected to each other at their adjacent ends, a draft frame rigidly secured to each implement, draft elements connecting said frames with the tractor, and a draft element connected to one implement adjacent the point of connection of said implements to each other and connected to the tractor at a point spaced laterally from the connection of the first named draft elements to the tractor.

9. A duplex field implement and hitch therefor comprising in combination with a tractor, two wheeled implements transversely positioned behind the tractor in longitudinally spaced relation with respect to each other, said implements being pivotally connected to each other at their adjacent ends, a draft frame rigidly secured to each implement, draft elements connecting said frames with the tractor, and a draft element connected to one implement adjacent the point of connection of said implements to each other and connected to the tractor at a point spaced laterally from the connection of the first named draft elements to the tractor, at least one of said elements being rigid.

10. A duplex field implement and hitch therefor comprising in combination with a tractor, two wheeled implements transversely positioned behind the tractor in longitudinally spaced relation with respect to each other, said implements being pivotally connected to each other at their adjacent ends, a draft frame rigidly secured to each implement, draft elements connecting said frames with the tractor, and a draft element connected to one implement adjacent the point of connection of said implements to each other and connected to the tractor at a point spaced laterally from the connection of the first named draft elements to the tractor, at least one of said elements being rigid and adjustable.

11. A duplex field implement and hitch therefor comprising in combination with a tractor, two wheeled implements transversely positioned behind the tractor in longitudinally spaced relation with respect to each other, said implements being pivotally connected to each other at their adjacent ends, draft means connected to the tractor and to each implement at points spaced transversely from the pivotal connection between the implements, and a draft element connected to one of the implements adjacent the point of connection of said implements with each other and connected to the tractor at a point spaced laterally from the connection of the draft means to the tractor.

12. A duplex field implement and hitch therefor comprising in combination with a tractor, two wheeled implements transversely positioned behind the tractor in longitudinally spaced relation with respect to each other, said implements being pivotally connected to each other at their adjacent ends, draft means connected to the tractor and to each implement at points spaced transversely from the pivotal connection between the implements, and a draft element connected to one of the implements adjacent the point of connection of said implements with each other and connected to the tractor at a point spaced laterally from the connection of the draft means to the tractor, said draft element being rigid for transmitting pressure.

ARNOLD E. W. JOHNSON.